United States Patent [19]
Flick

[11] 3,719,237
[45] March 6, 1973

[54] TUBING TONG HYDRAULIC DRIVE SYSTEM

[75] Inventor: Howard S. Flick, Long Beach, Calif.

[73] Assignee: Byron Jackson, Inc., Long Beach, Calif.

[22] Filed: June 21, 1971

[21] Appl. No.: 155,054

[52] U.S. Cl. ............173/12, 81/57.14, 81/57.22, 173/163
[51] Int. Cl. ...........................................E21b 19/16
[58] Field of Search ................173/12, 163; 91/59; 81/57.11–57.14, 57.22; 175/85; 166/77.5

[56] References Cited

UNITED STATES PATENTS

| 3,330,164 | 7/1967 | Wilson | 173/163 X |
| 3,437,158 | 4/1969 | Proffer | 173/163 |
| 3,625,095 | 3/1970 | Barnett et al. | 81/57.22 |

*Primary Examiner*—Ernest R. Purser
*Attorney*—Donald W. Banner et al.

[57] ABSTRACT

A power tong combination having a tong head for threaded pipe adapted to be driven in opposite pipe gripping and turning directions by a driving system which (1) drives only a first motor at a preselected torque and at high speed in the direction to connect threaded pipe: (2) jointly drives the first motor and a second motor to produce increased yet controlled torque to finally make up a pipe joint, and (3) jointly drives both motors to provide high torque to break out a pipe joint and then drives only the first motor to provide less torque and high speed to rapidly disconnect the pipe joint whereby the pipe gripping means remains engaged with pipe during the foregoing changes in speed and torque.

10 Claims, 3 Drawing Figures

3,719,237

INVENTOR
HOWARD S. FLICK

BY John O. Evans, Jr.
James M. Rippin

INVENTOR
HOWARD S. FLICK

TUBING TONG HYDRAULIC DRIVE SYSTEM

BACKGROUND OF THE INVENTION

Field of the Invention

The present invention generally relates to power tongs, or wrenches, of the type generally employed for the purpose of making up or breaking out joints in well pipe or tubing strings or strings of sucker rods, all herein generically called pipe, as the string is run into or retrieved from a well, such as an oil or gas well. Specifically, the present invention is directed to improvements in power tongs of the kind disclosed in U.S. Pat. Nos. 3,481,228, 3,481,229 and 3,483,774.

SUMMARY OF THE INVENTION

Accordingly, among the objects of the present invention is the provision of a tong assembly having pipe gripping means adapted to grip and rotate a pipe or coupling in either direction, and improved power transmission means adapted to drive the pipe gripping means in opposite directions and to perform different functions during the connection and disconnection of a string of pipe.

Another object is to provide a tong assembly having pipe gripping means and means for cummulatively applying power to the gripping means to rotate the latter at relatively high speed with preselected torque, relatively lower speed with higher preselected torque, relatively low reverse speed with high preselected torque and relatively high reverse speed with less torque.

Still another object of the invention is the provision of a tong assembly including pipe gripping means revolvable in opposite directions, and power means for rotating the pipe gripping means at high speed with low torque and at lower speed with high torque, at the option of the operator, thus facilitating the threading or unthreading and making up or breaking out the pipe couplings or joints as the pipe is being connected and run into a well and subsequently disconnected and removed therefrom.

A still further object is to provide a power tong assembly and power means therefor in accordance with the foregoing, wherein a plurality of motors is included in the power transmission means for driving the pipe gripping means at high speed and preselected torque with one motor, and at lower speed and higher torque with more than one motor.

The foregoing and other objects and advantages are provided in a power tong combination having rotatable pipe gripping means, a first hydraulic motor with means connected to rotate said pipe gripping means in either direction, a second hydraulic motor with clutch means cooperating to rotate said pipe gripping means in either direction only when said second motor is actuated, and fluid valving means connected to said first motor and said second motor and adapted for connection to a source of hydraulic fluid under pressure. The valving means comprises first control valve means connected for conducting hydraulic fluid to drive said first motor in either direction, first hydraulic pressure control means cooperating with said first control valve means to control the pressure of hydraulic fluid conducted to rotate said first motor in a first direction and thereby regulate the torque produced by said first motor only in said first direction, a second control valve means connected to direct hydraulic fluid to drive said second motor jointly with said first motor to produce torque in addition to the torque produced by said first motor, second hydraulic pressure control means cooperating with said second control valve and said first hydraulic pressure control means to adjust said first hydraulic pressure control means when hydraulic pressure is directed to rotate both said first motors in said first direction and thereby regulate the cummulative torque produced by said motors only in said first direction, and mechanical linkage means cooperating with said first valve and said second valve to cause said second valve to be actuated after actuation of said first valve to direct hydraulic fluid to first drive said first motor then subsequently drive both said motors in said first direction and also to cause both said first valve and said second valve to be concurrently actuated then subsequently cause said second valve to be deactuated while said first valve continues to be actuated to direct hydraulic fluid to first drive both said motors then subsequently drive only said first motor in a second direction.

DESCRIPTION OF THE PREFERRED EMBODIMENTS

Figure 1:
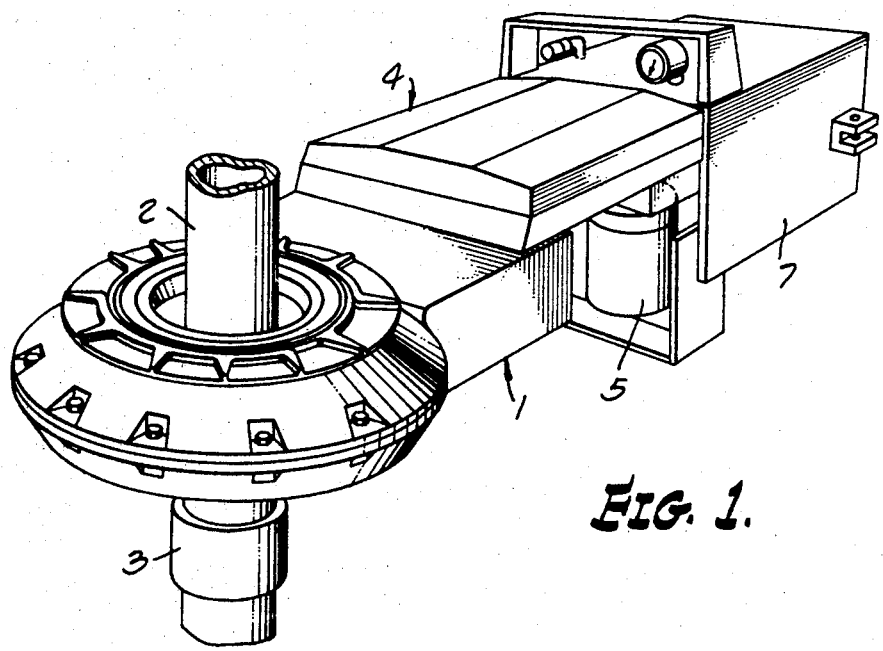
FIG. 1 is a perspective view of a power tong embodying the present invention.
Figure 2:
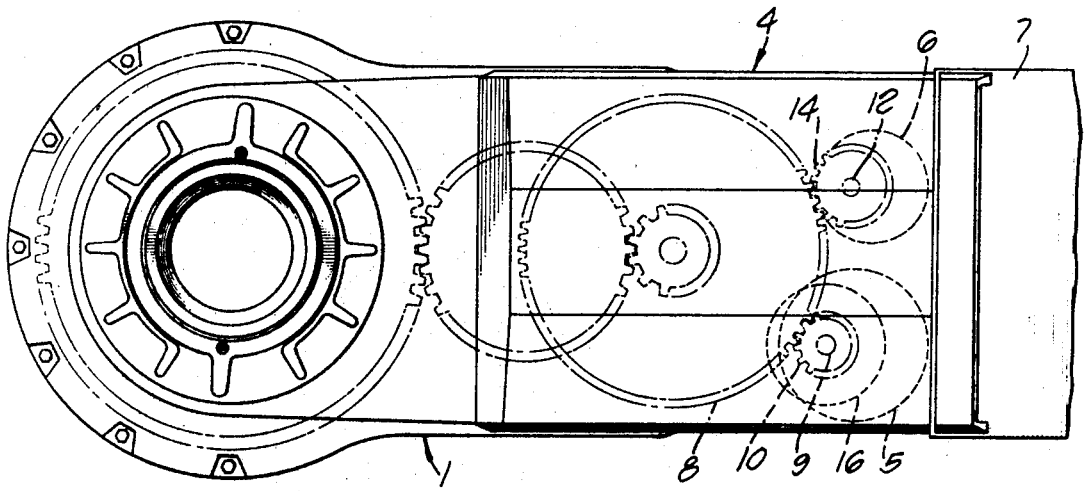
FIG. 2 is a fragmentary plan view of the structure of FIG. 1, showing the tong head and power transmission subassemblies.

Referring first to FIGS. 1 and 2, a tong assembly embodying the invention will be seen to comprise three subassemblies comprising a pipe gripping or tong head assembly 1 adapted to grip a joint and rotate the same relative to another joint, which joints together compose a threaded connection or joint between stands of well tubing or pipe or sucker rods, all of which are generically referred to herein as pipe, an illustrative length of which is generally illustrated at 2 and includes a joint or coupling 3.

Also included in the tong assembly is a power transmission subassembly generally denoted at 4 which contains drive means for effecting rotation of the pipe gripping mechanism included in the tong head. Included in the power transmission subassembly is a plurality of motors, designated 5 and 6 in the illustrative embodiment. These motors, as will hereinafter be more fully described, are adapted to drive the transmission mechanism at a relatively high speed and low torque, and at a relatively low speed and cummulative high torque in either direction.

Further, the composite assembly includes a control subassembly generally denoted at 7 whereby an operator of the tong, in the making up and breaking out of pipe or rod joints, will be enabled to cause the motor 6 to operate in either selected direction, while motor 5 remains idle, so as to drive the pipe gripping mechanism at a relatively high rate of speed but at low torque, such as would be desirable when a joint is being initially made up and offers little torque resistance, such relatively high speed initial making up of the joint being generally referred to in the art as "spinning." Thereafter it is desired that the joint be finally made up by the application of relatively high torque forces which the tong operator may accomplish by causing, through the manipulation of the control mechanism 7, the operation of motor 5 in addition to operation of motor 6 in such a manner that the transmission mechanism will impart to the gripping mechanism high torque at low speed, so as to shoulder or finally tighten up the joint.

Alternatively, in the breaking out of a joint the gripping mechanism must impose high torque on the joint in order to initiate its rotation so that the control mechanism 7 is adapted to enable the reverse rotation of both of the motors 5 and 6 in such a manner as to cause high torque low speed rotation of the pipe gripping mechanism to initially break out the joint. Thereafter, the control mechanism may be manipulated to allow the motor 5 to idle as the motor 6 continues to drive the pipe gripping mechanism at a relatively high speed under the reduced torque requirements for spinning the joint out.

The motors 5 and 6 are adapted to drive a drive ring 8 through mounting beneath a portion of the transmission case which extends to the rear of the head case. The motors 5 and 6 are preferably of the reversible hydraulic fluid type. Motor 5 is equipped with an output shaft 9 which is connected through a double-acting, self-energizing, overrunning clutch means 16 to drive a pinion 10 which is engaged with gear ring 8 within the transmission case. Motor 6 is equpped with an output shaft 12 connected to drive a pinion 14 which is also engaged with gear ring 8.

Motor 5 always drives the gear ring 8 in addition to motor 6. Clutch 16 is energized to transmit torque between the output shaft 9 and pinion 10 only at such time as hydraulic fluid is supplied to drive the respective motor 5. Thus, if the motor connected to clutch 16 is not operating, the clutch is de-energized and the pinion 10 idles along with gear ring 8. When motor 5 is operated the clutch 16 is engaged and motor 5 when operated will be effective to drive the ring gear in either direction. More detailed description of a power tong structure as shown in FIGS. 1 and 2 is taught in U.S. Pat. No. 3,481,229 specifically incorporated herein by reference.

In the desirable sequence of functions employed to make up successive joints of pipe 2 into a continuous pipe string, each joint of pipe 3 is positioned in axial alignment into a box or collar 2 and rotated to permit the complementary threads to properly register and start into threaded connection. At such time as the threads are started the pipe may be rotated rapidly to spin the threads into initial connection. After the threaded connection has been initially made it is then finally made up by application of substantially high and controlled torque applied at a low rotational speed.

As each joint of pipe 2 is subsequently disconnected from a collar 3 during removal of the pipe string, high torque is first applied at low speed to break out the threaded connection followed by application of less torque at high speed to spin the threads of the loosened pipe to free the pipe from the collar.

Figure 3:
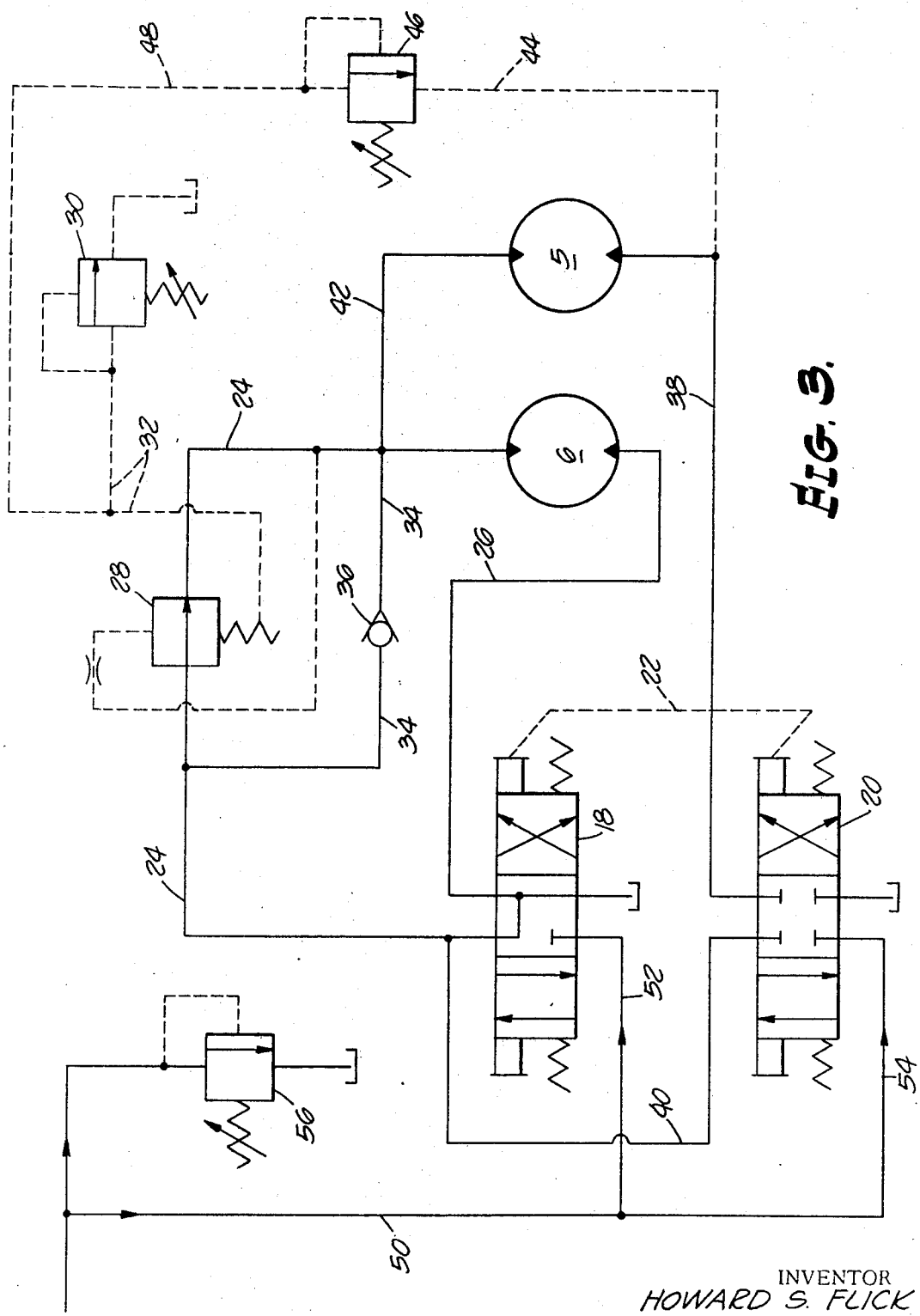
FIG. 3 is a graphic illustration of a hydraulic control system of the present invention wherein the hydraulic symbols conform to American Standards Association ASA Y 32.10.

The foregoing functions are provided for the power tong through provision of the system shown in FIG. 3. Directional control valves 18 and 20 are shown as conventional manually operated 4-way 3 position spool valves. These valves are shown as being spring or otherwise biased into normally neutral position and may be suitably mounted with the control subassembly 7 if desired. These valves alternately may be remotely mounted and/or operated by electrical, pneumatic or hydraulic control means as desired.

Valves 18 and 20 are preferably linked or coupled by linkage means 22 to provide a desired sequency of actuation of the valves as later described. Linkage 22 may be of mechanical type, for example, or of other appropriate type for external or remote operation as previously mentioned.

Valve 18 as provided has a closed center float spool to allow fluid circulation between the outlet ports of the valve and communication between the outlet ports and return reservoir when the valve is in neutral position. Valve 20 as provided has a closed center spool to block the inlet ports and the outlet ports when the valve is in neutral position.

The outlet ports of control valve 18 are connected with the work ports of a motor 6 through a hydraulic line 24 and a hydraulic line 26. An adjustable pressure reducing control valve 28 is incorporated into line 24 between valve 18 and motor 6 for the purpose of regulating the inlet pressure of hydraulic fluid driving motor 6 in one direction and thereby regulating the torque produced by the motor. As provided the torque produced by motor 6 is regulated by control valve 28 only when the motor is rotated in the direction to cause tong head assembly 1 to threadedly connect a section of pipe 2 into a coupling 3.

The downstream pressure of hydraulic fluid flowing through line 24 to motor 6 is adjustably regulated by an adjustable relieving back pressure pilot valve 30 which is connected through a control line 32 to regulate pressure control valve 28.

A hydraulic return line 34 is shown connected in shunt across control valve 28 into communication with line 24. A check valve 36 is incorporated into return line 34 to permit hydraulic fluid to bypass control valve 28 and flow through line 34 only from motor 6 to control valve 18 with no return flow through line 34. Thus, when valve 18 is positioned to permit hydraulic fluid to flow through line 26 into motor 6 to cause reverse rotation of the motor, the fluid exhausting from the motor flows through line 34, valve 36, line 24 and valve 18 to reservoir. Reversal of valve 18 causes hydraulic fluid to flow through control valve 28 at regulated pressure into motor 6 and rotate the motor at selected torque and in opposite direction as previously described. When valve 18 is in neutral position as shown, fluid is free to circulate at reservoir pressure between the outlet ports of the valve and through lines 24, 34 and 26 as previously mentioned and through motor 6 (which behaves as a positive displacement pump when externally rotated) permitting free rotation of motor 6.

The outlet ports of control valve 20 are connected to the work ports of motor 5 through a hydraulic line 38 to one port of motor 5 and through a hydraulic circuit including lines 40, 24, 34 and 42 to the other port of motor 5 as shown.

As connected, fluid flow through valve 20 is blocked when the valve is in neutral position and motor 5 (which also behaves as a positive displacement pump when externally rotated) is locked against rotation. It is to be noted that clutch 16 (FIG. 2) is disengaged at such time as motor 5 is not being driven by fluid pressure, permitting pinion 10 to idle freely in response to rotation of ring gear 8.

It is also to be noted that the fluid pressure in line 38 is the same as in line 42 when valve 20 is in neutral position.

At such time as valve 20 is actuated to direct hydraulic fluid through lines 40, 24 and 42 to rotate motor 5, the pressure of the fluid is regulated by control valve 28 to control the torque produced by motor 5. When motor 5 is being rotated by fluid passing through control valve 28, such fluid at the same pressure is available to rotate motor 6 in the same direction with controlled torque, providing that line 26 is open to reservoir through valve 18.

When motor 5 is being rotated by fluid from control valve 28, the fluid exhausting from the motor through line 38 and valve 20 to reservoir is substantially at low reservoir pressure.

Line 38 is connected through a control line 44 to the outlet of an adjustable pressure pilot relief valve 46. The inlet of relief valve 46 is connected through a control line 48 to the control line 32 of pilot valve 30. When the fluid pressure in line 38 remains the same as or greater than the pressure in line 42, relief valve 46 remains closed and has no effect on pilot valve 30. Relief valve 46 is thus closed when motor 5 is blocked from rotation by the neutral position of valve 20 or when motor 5 is being rotated by fluid directed through line 38 from valve 20 as the valve is appropriately actuated.

When valve 20 is actuated to direct fluid through control valve 28 to rotate motors 5 and 6, the fluid pressure in line 38 drops substantially below the pressure in line 42. At such time the pressure in control line 44 drops substantially below the pressure in control line 48 which causes relief valve 46 to open and thereby reduce the pressure in control line 48 and pilot valve control line 32 to a preselected lower level. In effect, the opening of relief valve 46 serves to bypass pilot valve 30 and the downstream pressure of control valve 28 is reset to another preselected level established by the back pressure permitted by relief valve 46.

As provided, linkage 22 preferably causes actuation of valve 18 to occur before actuation of valve 20 when hydraulic fluid is directed through control valve 28 to first rotate motor 6 and later rotate both motors 6 and 5. Linkage 22 further preferably causes valves 20 and 18 to be concurrently actuated to direct hydraulic fluid through conduits 38 and 26 to first rotate both motors 6 and 5 in the opposite direction, then to return valve 20 to neutral position while leaving valve 18 actuated for later return to neutral position.

With the structure and linkage 22 as described valve 18 may be first actuated to cause motor 6 to be rotated at controlled torque to spin the threads of pipe 2 (FIG. 2) into collar 3. When the connection begins to tighten, valve 20 is then actuated to cause motor 5 to be rotated in addition to rotation of motor 6 and at a cumulative torque established by control valve 28 when reset by relief valve 46. When reverse rotation is desired to break out then spin out the threads of a connection, linkage 22 causes concurrent actuation of motors 5 and 6 at maximum torque to break out the connection and then continued actuation of valve 18 while returning valve 20 to neutral position to cause motor 6 only to spin out the connection. Valve 18 is also returned to neutral position after disconnection of pipe 2 from coupling 3.

Hydraulic fluid under pressure is supplied to the inlets of valves 18 and 20 through hydraulic supply lines 50, 52 and 54 from a source P as shown. The maximum pressure from source P may be regulated by a relief type valve 56 having its inlet connected to line 50. Alternatively, valve 50 can be a pressure reducing type valve incorporated into line 50 if desired.

As an example, valve 56 may be set to permit a maximum fluid pressure of 2500 psi to be delivered to valves 18 and 20. The control valve 28 may be adjusted by pilot valve 30 to deliver fluid pressure to motor 6 sufficient for motor 6 to produce up to about 1200 ft/lbs. torque, for example, to spin up a threaded connection. Control valve 28 then may be subsequently readjusted by relief valve 46 for motors 5 and 6 to jointly produce up to about 5000 ft/lbs. torque, for example, to finally make up a threaded connection.

When valves 18 and 20 are concurrently actuated to rotate both motors 5 and 6 in opposite direction to break out a threaded joint, greater torque may be available to the extent of utilizing the full allowable pressure from source P. The foregoing valves are exemplary only and are subject to substantial variation depending on the size and kind of threaded pipe to be connected and disconnected.

The foregoing description and drawings will suggest other embodiments and variations to those skilled in the art, all of which are intended to be included in the spirit of the invention as herein set forth and defined.

What being claimed is:

1. A power tong combination having rotatable pipe gripping means, a first hydraulic motor with means connected to rotate said pipe gripping means in either direction, a second hydraulic motor with clutch means cooperating to rotate said pipe gripping means in either direction only when said second motor is actuated, and fluid valving means connected to said first motor and said second motor and adapted for connection to a source of hydraulic fluid under pressure, said valving means comprising: a fist control valve means connected for conducting hydraulic fluid to drive said first motor in either direction, first hydraulic pressure control means cooperating with said first control valve means to control the pressure of hydraulic fluid conducted to rotate said first motor in a first direction and thereby regulate the torque produced by said first motor only in said first direction, a second control valve means connected to direct hydraulic fluid to drive said second motor jointly with said first motor to produce torque in addition to the torque produced by said first motor, second hydraulic pressure control means cooperating with said second control valve and said first hydraulic pressure control means to adjust said first hydraulic pressure control means when hydraulic pressure is directed to rotate said first motor and said second motor in said first direction and thereby regulate the cummulative torque produced by said motors only in said first direction.

2. A power tong combination as defined in claim 1 and including mechanical linkage means cooperating with said first valve and said second valve to cause said second valve to be actuated after actuation of said first valve to direct hydraulic fluid to first drive said first motor then subsequently drive both said motors in said first direction and also to cause both said first valve and said second valve to be concurrently actuated then subsequently cause said second valve to be deactuated while said first valve continues to be actuated to direct hydraulic fluid to first drive both said motors then subsequently drive only said first motor in a second direction.

3. A power tong combination having rotatable pipe gripping means, a first hydraulic motor with means connected to rotate said pipe gripping means in either direction, a second hydraulic motor with clutch means cooperating to rotate said pipe gripping means in either direction only when said second motor is actuated, and fluid valving means connected to said first motor and said second motor and adapted for connection to a source of hydraulic fluid under pressure, said valving means comprising: a first control valve means connected for conducting hydraulic fluid to drive said first motor in either direction, first hydraulic pressure control means cooperating with said first control valve means to control the pressure of hydraulic fluid conducted to rotate said first motor in a first direction and thereby regulate the torque produced by said first motor only in said first direction, a second control valve means connected to direct hydraulic fluid to drive said second motor jointly with said first motor to produce torque in addition to the torque produced by said first motor in either direction.

4. The power tong combination of claim 3 including mechanical linkage means cooperating with said first valve and said second valve to cause said second valve to be actuated after actuation of said first valve to direct hydraulic fluid to first drive said first motor then subsequently drive both said motors in said first direction and also to cause both said first valve and said second valve to be concurrently actuated then subsequently cause said second valve to be deactuated while said first valve continues to be actuated to direct hydraulic fluid to first drive both said motors then subsequently drive only said first motor in a second direction.

5. A power tong combination having rotatable pipe gripping means, a first hydraulic motor with means connected to rotate said pipe gripping means in either direction, a second hydraulic motor with clutch means cooperating to rotate said pipe gripping means in either direction only when said second motor is actuated, and fluid valving means connected to said first motor and said second motor and adapted for connection to a source of hydraulic fluid under pressure, said valving means comprising: a first control valve means connected for conducting hydraulic fluid to drive said first motor in either direction, a second control valve means connected to direct hydraulic fluid to drive said second motor jointly with said first motor to produce torque in addition to the torque produced by said first motor, and mechanical linkage means cooperating with said first valve and said second valve to cause said second valve to be actuated after actuation of said first valve to direct hydraulic fluid to first drive said first motor then subsequently drive both said motors in said first direction and also to cause both said first valve and said second valve to be concurrently actuated then subsequently cause said second valve to be deactuated while said first valve continues to be actuated to direct hydraulic fluid to first drive both said motors then subsequently drive only said first motor in a second direction.

6. A hydraulic power system adapted to actuate a power tong having a reversibly rotatably pipe gripping means, comprising: a first reversible hydraulic motor adapted to be rotatably connected directly to drive said pipe gripping means, a second reversible hydraulic motor adapted to be rotatably connected to said pipe gripping means through an overrunning, self-energizing clutch means, and valving means connected to said first motor and said second motor and adapted for connection to a source of hydraulic fluid under pressure, said valving means including a first control valve means connected for conducting said hydraulic fluid to drive said first motor in either direction, first hydraulic pressure control means connected with said first control valve means and both said motors for controlling the pressure of said hydraulic fluid conducted to rotate said motors in a first direction only to regulate the torque produced thereby, a second control valve means connected for conducting said hydraulic fluid to drive said second motor in either direction jointly with said first motor to produce torque in addition to torque produced by said first motor, second hydraulic control means connected with said second control valve and said first pressure control means to adjust said first pressure control means when hydraulic fluid is directed by said valves for rotating both said motors in said first direction to regulate the cummulative torque produced by said motors in said first direction.

7. A hydraulic power system as defined in claim 6 and including mechanical linkage means cooperating with said first valve and said second valve to cause said second valve to be actuated after actuation of said first valve to direct hydraulic fluid to first drive said first motor then subsequently drive both said motors in said first direction and also to cause both said first valve and said second valve to be concurrently actuated then subsequently caused said second valve to be deactuated while said first valve continues to be actuated to direct hydraulic fluid to first drive both said motors then subsequently drive only said first motor in a second direction.

8. A hydraulic power system adapted to actuate a power tong having a reversibly rotatable pipe gripping means, comprising: a first reversible hydraulic motor adapted to be rotatably connected directly to drive said pipe gripping means, a second reversible hydraulic motor adapted to be rotatably connected to said pipe gripping means through an overrunning, self-energizing clutch means, and valving means connected to said first motor and said second motor and adapted for connection to a source of hydraulic fluid under pressure, said valving means including a first control valve means connected for conducting said hydraulic fluid to drive said first motor in either direction, first hydraulic pressure control means connected with said first control valve means and both said motors for controlling the pressure of said hydraulic fluid conducted to rotate said motors in a first direction only to regulate the torque produced thereby, a second control valve means connected for conducting said hydraulic fluid to drive said second motor in either direction jointly with said first motor to produce torque in addition to torque produced by said first motor.

9. A hydraulic power system as defined in claim 8 and including mechanical linkage means cooperating with said first valve and said second valve to cause said second valve to be actuated after actuation of said first valve to direct hydraulic fluid to first drive said first motor then subsequently drive both said motors in said first direction and also to cause both said first valve and said second valve to be concurrently actuated then subsequently cause said second valve to be deactuated while said first valve continues to be actuated to direct hydraulic fluid to first drive both said motors then subsequently drive only said first motor in a second direction.

10. A hydraulic power system adapted to actuate a power tong having a reversibly rotatable pipe gripping means, comprising: a first reversible hydraulic motor adapted to be rotatably connected directly to drive said pipe gripping means, a second reversible hydraulic motor adapted to be rotatably connected to said pipe gripping means through an overrunning, self-energizing clutch means, and valving means connected to said first motor and said second motor and adapted for connection to a source of hydraulic fluid under pressure, said valving means including a first control valve means connected for conducting said hydraulic fluid to drive said first motor in either direction, a second control valve means connected for conducting said hydraulic fluid to drive said second motor in either direction jointly with said first motor to produce torque in addition to torque produced by said first motor, and mechanical linkage means cooperating with said first valve and said second valve to cause said second valve to be actuated after actuation of said first valve to direct hydraulic fluid to first drive said first motor then subsequently drive both said motors in said first direction and also to cause both said first valve and said second valve to be concurrently actuated then subsequently caused said second valve to be deactuated while said first valve continues to be actuated to direct hydraulic fluid to first drive both said motors then subsequently drive only said first motor in a second direction.

* * * * *

UNITED STATES PATENT OFFICE
CERTIFICATE OF CORRECTION

Patent No. 3,719,237      Dated March 6, 1973

Inventor(s)   Howard S. Flick

It is certified that error appears in the above-identified patent and that said Letters Patent are hereby corrected as shown below:

Column 6, line 52, "fist" should read -- first --.

Column 4, line 12, "sequency" should read -- sequence --.

Signed and sealed this 26th day of March 1974.

(SEAL)
Attest:

EDWARD M. FLETCHER, JR.  
Attesting Officer

C. MARSHALL DANN  
Commissioner of Patents